US012590813B2

(12) United States Patent (10) Patent No.: US 12,590,813 B2
Zhang (45) Date of Patent: Mar. 31, 2026

(54) NAVIGATION INTERFACE DISPLAY METHOD AND APPARATUS, TERMINAL, AND STORAGE MEDIUM

(71) Applicant: TENCENT TECHNOLOGY (SHENZHEN) COMPANY LIMITED, Shenzhen (CN)

(72) Inventor: Honglong Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 191 days.

(21) Appl. No.: 18/455,705

(22) Filed: Aug. 25, 2023

(65) Prior Publication Data

US 2023/0400323 A1 Dec. 14, 2023

Related U.S. Application Data

(63) Continuation of application No. PCT/CN2022/126694, filed on Oct. 21, 2022.

(30) Foreign Application Priority Data

Nov. 16, 2021 (CN) .......................... 202111354456.4

(51) Int. Cl.
| | |
|---|---|
| *G01C 21/36* | (2006.01) |
| *G01C 21/32* | (2006.01) |
| *G06F 3/14* | (2006.01) |
| *G06F 9/451* | (2018.01) |
| *H04W 24/08* | (2009.01) |

(52) U.S. Cl.
CPC ......... *G01C 21/3694* (2013.01); *G01C 21/32* (2013.01); *G01C 21/3602* (2013.01); *G01C 21/3638* (2013.01); *G01C 21/3647* (2013.01);

*G01C 21/367* (2013.01); *G06F 3/1407* (2013.01); *G06F 9/451* (2018.02); *H04W 24/08* (2013.01)

(58) Field of Classification Search
None
See application file for complete search history.

(56) References Cited

U.S. PATENT DOCUMENTS

| | | | | | |
|---|---|---|---|---|---|
| 2004/0066316 | A1* | 4/2004 | Ogawa | ............... | G01C 21/3852 |
| | | | | | 345/501 |
| 2015/0369617 | A1* | 12/2015 | Ding | .................... | H04W 8/183 |
| | | | | | 701/428 |

FOREIGN PATENT DOCUMENTS

| | | | | |
|---|---|---|---|---|
| CN | 201503271 | U | * | 6/2010 |
| CN | 102538798 | A | * | 7/2012 |

(Continued)

*Primary Examiner* — Vivek D Koppikar
*Assistant Examiner* — David Ruben Pedersen
(74) *Attorney, Agent, or Firm* — Anova Law Group, PLLC

(57) ABSTRACT

A navigation interface display method includes: obtaining real-time environment information; determining a first interface component based on a first navigation scene corresponding to the real-time environment information, the first interface component including a first base map and a first sky box; and displaying a navigation interface obtained by fusing the first base map and the first sky box. The first base map indicates a road surface environment, the first sky box indicates a sky environment, and styles of interface components corresponding to different navigation scenes are different.

20 Claims, 11 Drawing Sheets

Obtain real-time environment information — 201

Determine a first interface component based on a first navigation scene corresponding to the real-time environment information — 202

Display a navigation interface obtained by fusing a first base map and a first sky box — 203

(56) References Cited

FOREIGN PATENT DOCUMENTS

| CN | 113223139 | A | * | 8/2021 | ........... | G06T 19/006 |
| KR | 20090102483 | A | * | 9/2009 | ......... | G01C 21/3638 |

* cited by examiner

Obtain real-time environment information ⟋ 201

Determine a first interface component based on a first navigation scene corresponding to the real-time environment information ⟋ 202

Display a navigation interface obtained by fusing a first base map and a first sky box ⟋ 203

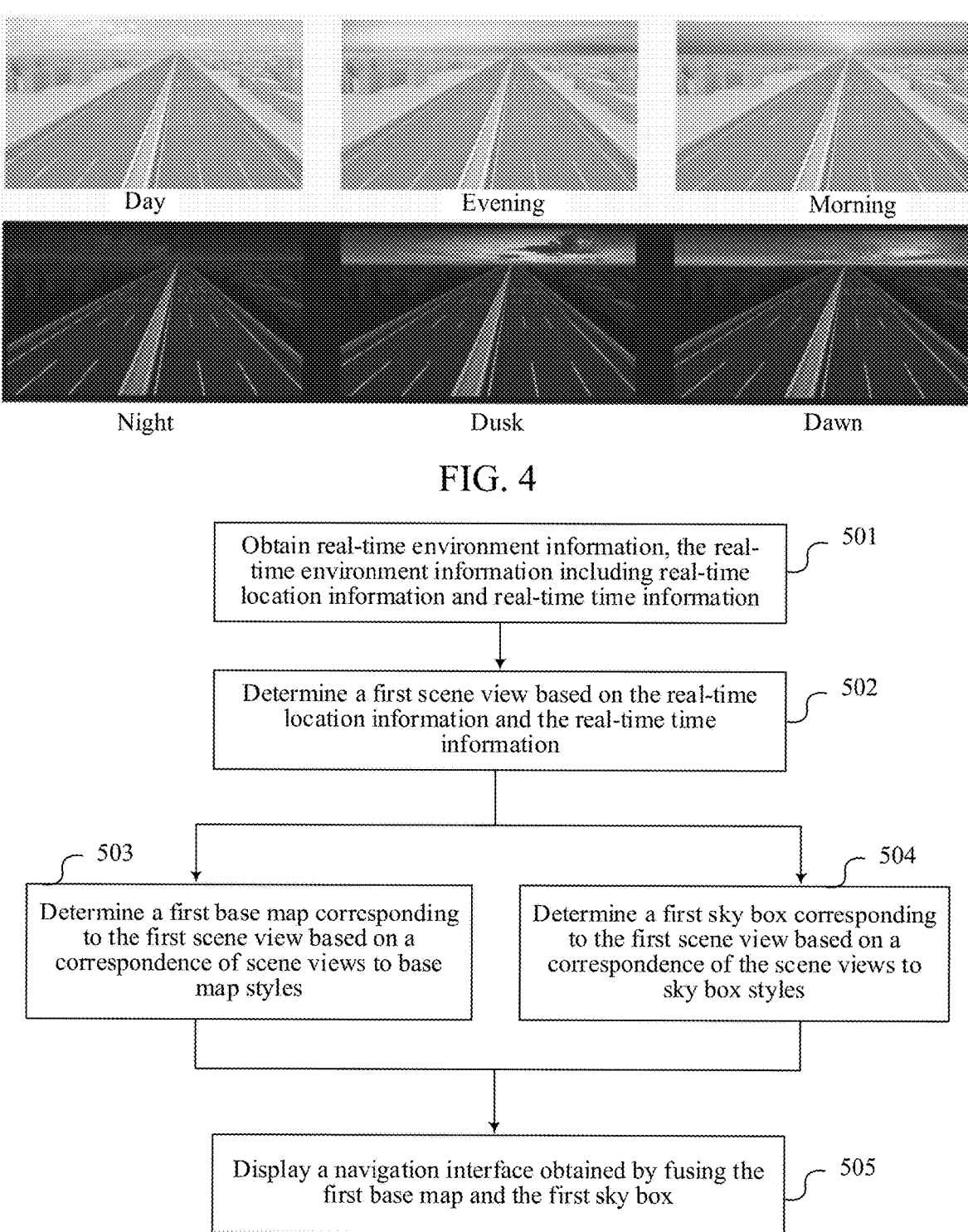

FIG. 4

Obtain real-time environment information, the real-time environment information including real-time location information and real-time time information — 501

Determine a first scene view based on the real-time location information and the real-time time information — 502

503 — Determine a first base map corresponding to the first scene view based on a correspondence of scene views to base map styles 504 — Determine a first sky box corresponding to the first scene view based on a correspondence of the scene views to sky box styles Display a navigation interface obtained by fusing the first base map and the first sky box — 505

FIG. 5

| View | Weather | Style index | Style description |
|---|---|---|---|
| Dawn | Sunny | 1 | Dawning |
| Morning | Sunny | 2 | Rising sun |
| Day | Sunny | 3 | Cloudlessness |
| Evening | Sunny | 4 | Glowing sky |
| Dusk | Sunny | 5 | Setting sun |
| Night | Sunny | 6 | Starry sky |
| ... | ... | ... | ... |

FIG. 6

Scaling-up operation

Skew angle of 40°            Skew angle of 65°

| Scale index | Actual scale (m) |
|-------------|------------------|
| 3 | 2000000 |
| 4 | 1000000 |
| 5 | 500000 |
| 6 | 200000 |
| 7 | 100000 |
| 8 | 50000 |
| 9 | 20000 |
| 10 | 10000 |
| 11 | 5000 |
| 12 | 2000 |
| 13 | 1000 |
| 14 | 500 |
| 15 | 200 |
| 16 | 100 |
| 17 | 50 |
| 18 | 20 |

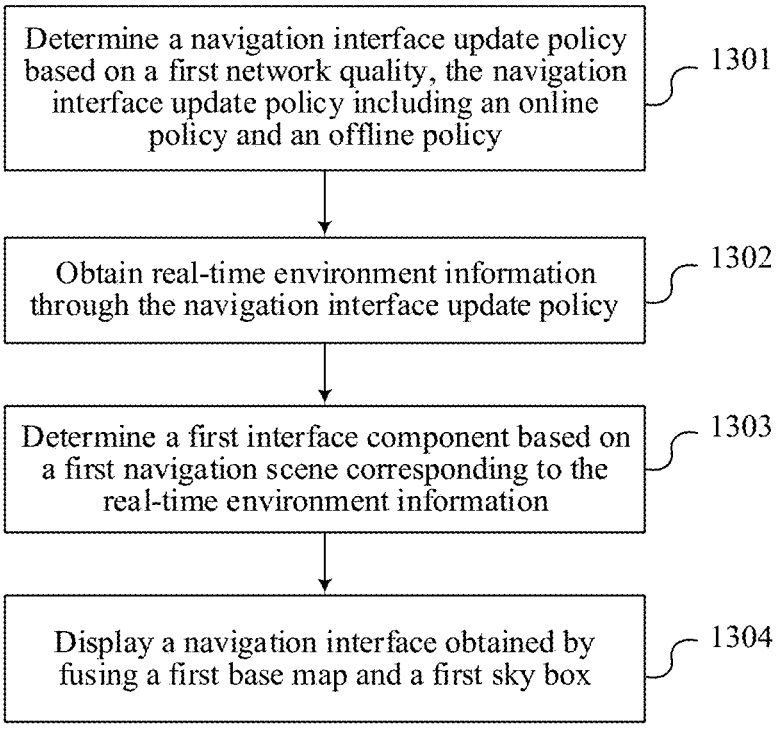

Determine a navigation interface update policy based on a first network quality, the navigation interface update policy including an online policy and an offline policy — 1301

Obtain real-time environment information through the navigation interface update policy — 1302

Determine a first interface component based on a first navigation scene corresponding to the real-time environment information — 1303

Display a navigation interface obtained by fusing a first base map and a first sky box — 1304

FIG. 13

NAVIGATION INTERFACE DISPLAY METHOD AND APPARATUS, TERMINAL, AND STORAGE MEDIUM

CROSS-REFERENCES TO RELATED APPLICATIONS

This application is a continuation application of PCT Patent Application No. PCT/CN2022/126694, filed on Oct. 21, 2022, which claims priority to Chinese Patent Application No. 202111354456.4, entitled "NAVIGATION INTERFACE DISPLAY METHOD AND APPARATUS, TERMINAL, STORAGE MEDIUM, AND PROGRAM PRODUCT" filed on Nov. 16, 2021, the entire contents of both of which are incorporated herein by reference.

FIELD OF THE TECHNOLOGY

Embodiments of the present disclosure relate to the technical field of navigation, and in particular, to a navigation interface display method and apparatus, a terminal, a storage medium, and a program product.

BACKGROUND

At present, online navigation functions are widely used. For example, online car-hailing application software, navigation application software, map application software, and the like are all required to provide navigation functions.

A navigation interface generally provides multiple display modes. A client is provided with an operation portal, and a user may select a day mode, a night mode, or an automatic mode. In the automatic mode, a terminal directly switches the night mode and the day mode according to a preset sunup time and sundown time. For example, the day mode is from 6:00 to 18:00, and the night mode is from 18:00 to 6:00 the next day.

However, the navigation interface only switches day mode and night mode according to a fixed time, and the mode transition is rigid and abrupt. For example, when approaching sundown, the ambient light is already dark while the navigation interface is still in the day mode. Due to a time difference, a weather difference, and other factors, the environment in different regions differs greatly, and a scene in the navigation interface may be inconsistent with an actual environment by using a uniform mode.

SUMMARY

Embodiments of the present disclosure provide a navigation interface display method and apparatus, a terminal, a storage medium, and a program product. The following technical solution is adopted.

According to an aspect, the embodiments of the present disclosure provide a navigation interface display method. The method is performed by a terminal. The method includes: obtaining real-time environment information, the real-time environment information including real-time location information and real-time time information; determining a first interface component based on a first navigation scene corresponding to the real-time environment information, the first interface component including a first base map and a first sky box, the first base map indicating a road surface environment, and the first sky box indicating a sky environment, and styles of interface components corresponding to different navigation scenes being different; and displaying a navigation interface obtained by fusing the first base map and the first sky box.

According to another aspect, the embodiments of the present disclosure provide a navigation interface display apparatus. The apparatus includes: an obtaining module, configured to obtain real-time environment information, the real-time environment information including real-time location information and real-time time information; a determination module, configured to determine a first interface component based on a first navigation scene corresponding to the real-time environment information, the first interface component including a first base map and a first sky box, the first base map indicating a road surface environment, the first sky box indicating a sky environment, and styles of interface components corresponding to different navigation scenes being different; and a display module, configured to display a navigation interface obtained by fusing the first base map and the first sky box.

According to another aspect, the embodiments of the present disclosure provide a terminal. The terminal includes at least one processor and at least one memory. The at least one memory stores at least one instruction, at least one program, a code set, or an instruction set. The at least one instruction, the at least one program, the code set, or the instruction set is loaded and executed by the at least one processor to implement the navigation interface display method as described in the foregoing aspects.

According to another aspect, the embodiments of the present disclosure provide a non-transitory computer-readable storage medium. The computer-readable storage medium stores at least one computer program. The computer program is loaded and executed by at least one processor to implement the navigation interface display method as described in the foregoing aspects.

The technical solution provided in the embodiments of the present disclosure may include at least the following beneficial effects:

In the embodiments of the present disclosure, a navigation scene is determined by obtaining time information and location information of a current environment, and a navigation interface is displayed using interface components corresponding to the current navigation scene, whereby a virtual environment presented by the navigation interface is consistent with the current actual environment, and a corresponding navigation environment can be displayed based on the difference of environments in different regions, the display effect of the navigation interface is optimized, and the authenticity of the displayed content of the navigation interface is improved.

BRIEF DESCRIPTION OF THE DRAWINGS

FIG. 4 is a schematic diagram of interface component styles in different navigation scenes according to an exemplary embodiment of the present disclosure.

FIG. 5 shows a flowchart of a navigation interface display method according to another exemplary embodiment of the present disclosure.

FIG. 6 is a schematic diagram of a style index according to an exemplary embodiment of the present disclosure.

FIG. 13 shows a flowchart of a navigation interface display method according to yet another exemplary embodiment of the present disclosure.

DESCRIPTION OF EMBODIMENTS

Figure 1:
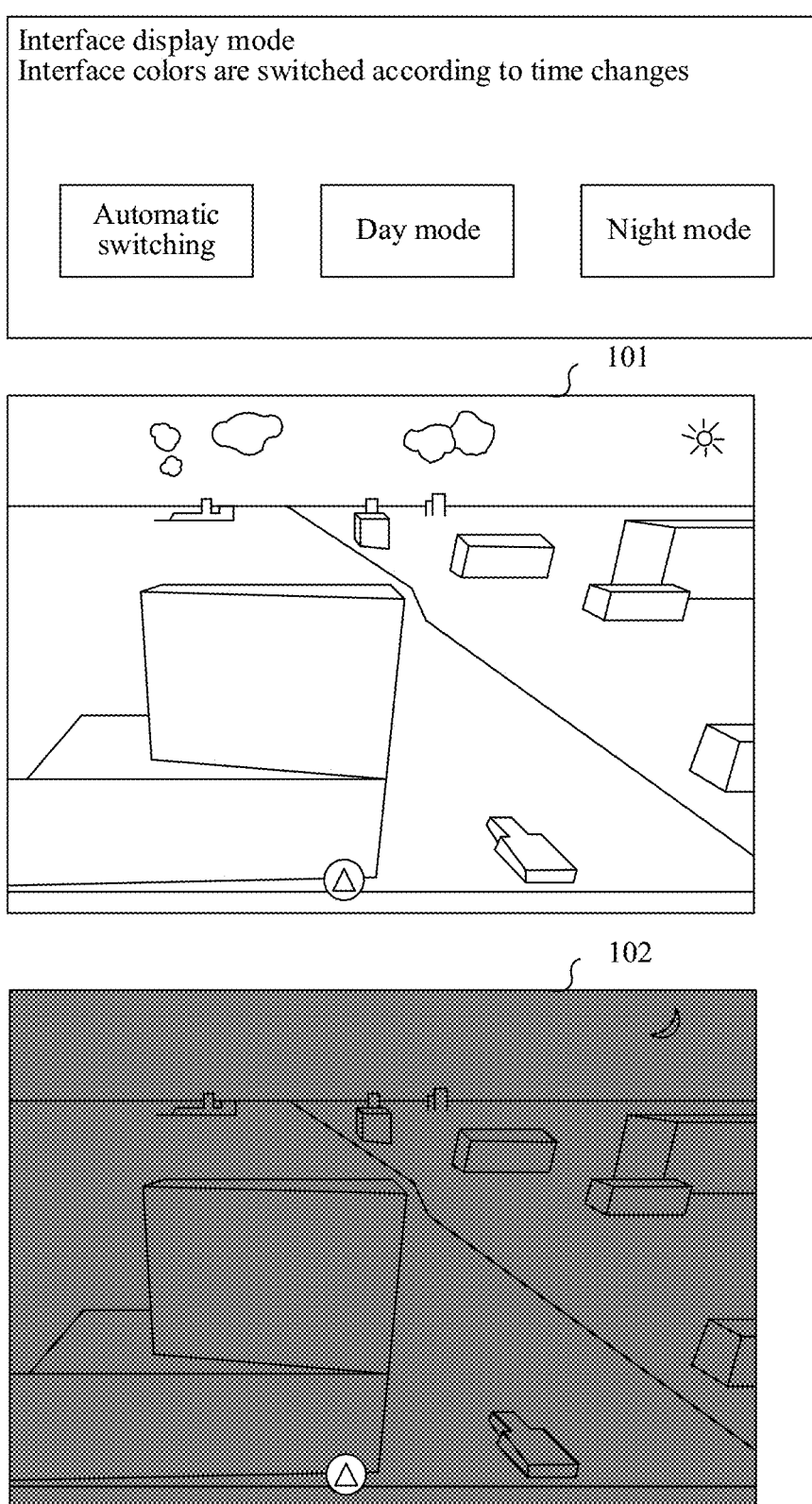
FIG. 1 shows a schematic diagram of a style update mode of a navigation interface.

A navigation interface generally provides multiple display modes. A client is provided with an operation portal, and a user may select a day mode, a night mode, or an automatic mode. In the automatic mode, a terminal directly switches the night mode and the day mode according to a preset sunup time and sundown time. For example, the day mode is from 6:00 to 18:00, and the night mode is from 18:00 to 6:00 the next day. As shown in FIG. 1, the terminal displays the navigation interface according to a day scene style 101 from 6:00 to 18:00, and displays the navigation interface according to a night scene style 102 from 18:00 to 6:00 the next day. The foregoing display modes mainly have the following problems: There is only the determination of day and night, and there is no transition interval in time. The switching is too rigid, and the brightness change of the interface cannot be consistent with the change of light in the real external environment. The terminal switches a display mode according to a system time. Since different terminal systems have different processing manners for time, the obtained system time may differ from an actual time. The sunup and sundown times on which the terminal is based are time zone standard times. Some countries and regions have vast territory, and the difference in the sunup and sundown times of the regions is relatively large. For example, the difference in the sunup and sundown times of a first region and a second region is about two hours. If a unified standard switching navigation interface style is used, some of night time periods in the second region will be displayed as a day mode, while day time periods will be displayed as a night mode. Different interface update policies are not set based on the difference in network quality, and the terminal may obtain more information for day-night mode switching when the network quality is good, but cannot update the interface in time when the network quality is poor.

In order to solve the foregoing technical problem, an embodiment of the present disclosure provides a navigation interface display method. According to the method, a navigation scene is determined by obtaining time information and location information of a current environment, and an environment type of a terminal location is determined based on real-time time information and real-time location information, whereby a virtual environment presented by the navigation interface is consistent with the current actual environment. Compared with the method adopting the uniform time switching interface mode, a corresponding navigation environment can be displayed based on the difference of environments in different regions, the display effect of the navigation interface is optimized, and the authenticity of the displayed content of the navigation interface is improved.

Figures 2, 3:
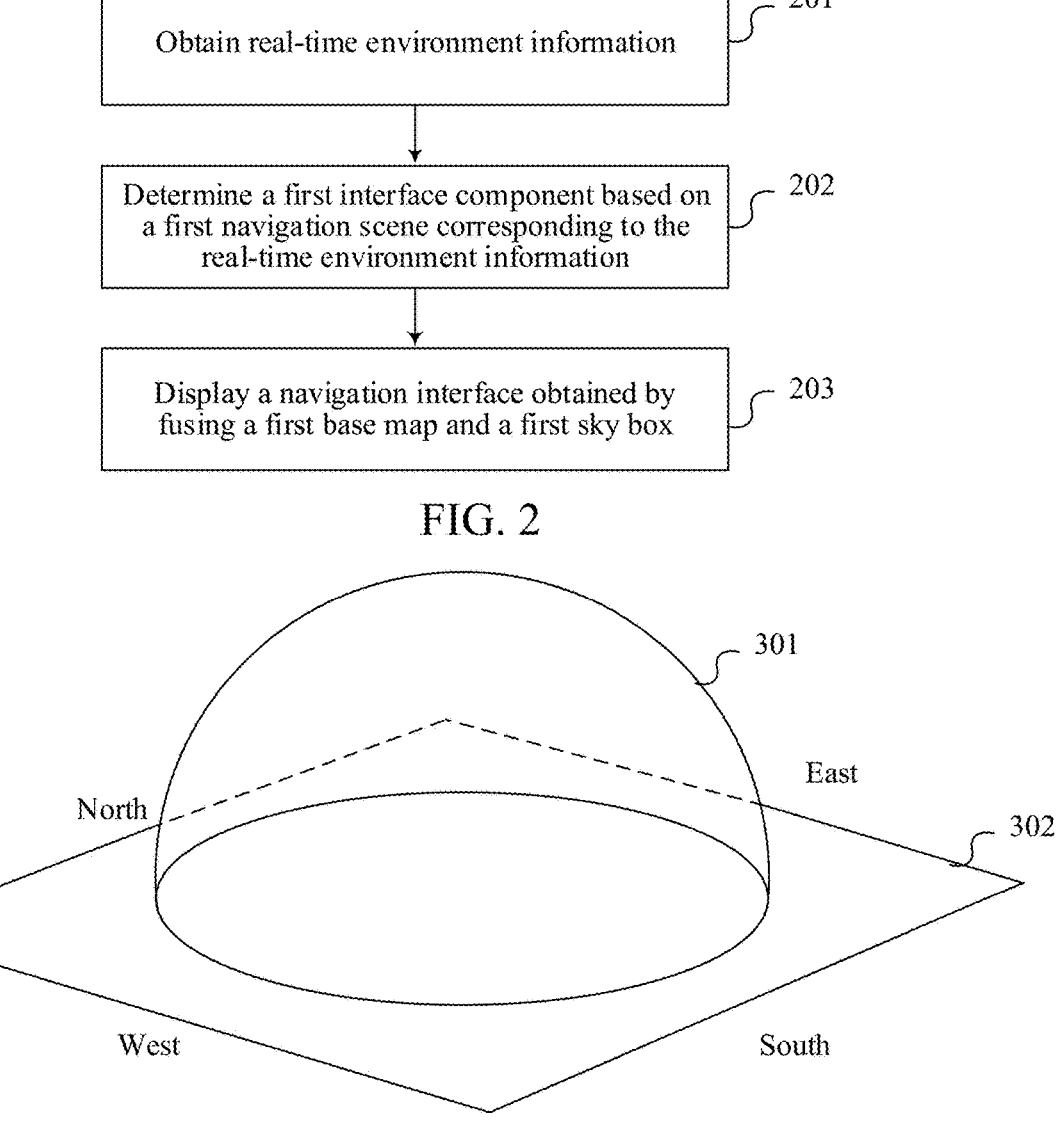
FIG. 2 shows a flowchart of a navigation interface display method according to an exemplary embodiment of the present disclosure.
FIG. 3 is a schematic diagram of a sky box and a base map according to an exemplary embodiment of the present disclosure.

FIG. 2 shows a flowchart of a navigation interface display method according to an exemplary embodiment of the present disclosure. This embodiment describes an example in which the method is applied to a terminal executing a navigation application. The method includes the following steps:

Step 201: Obtain real-time environment information.

In one embodiment, the terminal obtains real-time environment information. The real-time environment information is information for updating a virtual environment in a navigation interface. The virtual environment is used for reflecting an actual environment (time, place, weather, landscape, etc.) where a current user is located. The real-time environment information includes real-time location information and real-time time information such as latitude and longitude and date and time of the current user (location).

In some embodiments, the real-time environment information may further include other real-time information, such as real-time weather information.

In some embodiments, the terminal obtains the real-time environment information when starting the navigation application. During the execution of the navigation application, the terminal obtains the real-time environment information every predetermined time interval so as to update the navigation interface according to an actual scene. During the execution of the navigation application, the terminal obtains the real-time environment information when receiving a trigger operation of the user on the navigation interface.

Step 202: Determine a first interface component based on a first navigation scene corresponding to the real-time environment information.

The first interface component includes a first base map and a first sky box. The first base map is used for displaying a road surface environment. The first sky box is used for displaying a sky environment. Styles of interface components corresponding to different navigation scenes are different.

In one embodiment, the terminal determines a first navigation scene based on the real-time location information and the real-time time information, and then determines a first interface component based on the first navigation scene. For terminals at the same time (having the same real-time time information) and at different places (having different real-time location information), the first interface components thereof are different. For example, also at 19:00, the navigation interface displayed by the terminal of the first region is a night scene, while the navigation interface displayed by the terminal of a third region is a dusk scene.

With respect to the land and sky in an actual environment, the navigation interface is composed of a base map and a sky box. As shown in FIG. 3, the virtual environment in the navigation interface is composed of a dome-shaped sky 301 and a base 302.

Schematically, as shown in FIG. 4, a schematic diagram of a navigation interface of six navigation scenes (dawn, morning, day, evening, dusk, and night) is shown. Styles of sky boxes and base maps corresponding to different navigation scenes are different, and the styles of the sky boxes and the base maps can reflect a sky view and a land view in the corresponding scenes.

Step 203: Display a navigation interface obtained by fusing the first base map and the first sky box.

After obtaining the first base map and the first sky box, the terminal fuses the first base map and the first sky box, and then displays the navigation interface obtained by fusing the first base map and the first sky box based on a travel direction of the user and a current navigation perspective.

In summary, in this embodiment of the present disclosure, a navigation scene is determined by obtaining time information and location information of a current environment, and a navigation interface is displayed using interface components corresponding to the current navigation scene, whereby a virtual environment presented by the navigation interface is consistent with the current actual environment. Compared with the method adopting the uniform time switching interface mode, a corresponding navigation environment can be displayed based on the difference of environments in different regions, the display effect of the navigation interface is optimized, and the authenticity of the displayed content of the navigation interface is improved.

In one embodiment, on the basis of making the scene displayed by the navigation interface more realistic, the terminal performs special processing on the interface components, optimizes the navigation interface obtained by element fusion, and solves the problem of rigid sky and ground transition and poor fusion effect. FIG. 5 shows a flowchart of a navigation interface display method according to another exemplary embodiment of the present disclosure. This embodiment describes an example in which the method is applied to a terminal executing a navigation application. The method includes the following steps:

Step 501: Obtain real-time environment information, the real-time environment information including real-time location information and real-time time information.

An example embodiment of step 501 is similar to that of step 201, and is not described again in this embodiment of the present disclosure.

Step 502: Determine a first scene view based on the real-time location information and the real-time time information.

The terminal determines a first scene view corresponding to a first navigation scene based on the real-time location information and the real-time time information.

A scene view refers to a view in a navigation scene. The scene view is determined by the combination of time and place information. In one embodiment, the terminal first determines a current scene view based on the real-time location information and the real-time time information, and then determines the first interface component based on the first scene view. Step 502 includes the following steps:

Step 502a: Determine a sunup time and a sundown time corresponding to a real-time location based on latitude and longitude in the real-time location information and a date in the real-time time information.

Since the time of each region uses the standard time of the corresponding time zone, the latitude difference will lead to different views in different regions at the same time. For example, in the same time zone, the eastern region is in a night view, a sky view includes the moon and stars, and the sky is black. The western region is in dusk, the sky view includes the sun, and the sky is yellow. The hues corresponding to the two land views are also different. If each region uses the same navigation interface at the same time, the navigation interfaces of some regions will be inconsistent with the actual scene. In one embodiment, in order to make the scene displayed by the navigation interface closer to the real situation, the terminal determines a sunup time and a sundown time corresponding to a real-time location based on latitude and longitude in the real-time location information and a date in the real-time time information, thereby determining time periods corresponding to scene views based on a local sunup time and sundown time.

Step 502b: Determine time periods corresponding to scene views based on the sunup time, the sundown time, time differences between time periods corresponding to the scene views and the sunup time, and time differences between the time periods corresponding to the scene views and the sundown time.

In one embodiment, a relationship (time difference) between the time period corresponding to each scene view and the sunup time, and a relationship (time difference) between the time period corresponding to each scene view and the sundown time are stored in the terminal. When the sunup time (of the day) and the sundown time are obtained, the terminal may determine the time period corresponding to each scene view at the current location.

Schematically, the navigation application is provided with interface components corresponding to six scene views. Assuming that the sunup time is $t_{up}$ and the sundown time is $t_{down}$, $(t_{up}-2)$ to $t_{up}$ are time periods corresponding to the dawn, where $(t_{up}-2)$ represents two hours before the sunup. $t_{up}$ to $(t_{up}+2)$ are time periods corresponding to the morning, where $(t_{up}+2)$ represents two hours after the sunup. $(t_{down}-1)$ to $(t_{down}+1)$ are time periods corresponding to the evening, where $(t_{down}-1)$ represents one hour before the sundown, and $(t_{down}+1)$ represents one hour after the sundown. $(t_{down}+1)$ to $(t_{down}+3)$ are time periods corresponding to the dusk, where $(t_{down}+3)$ represents three hours after the sundown. $(t_{up}+2)$ to $(t_{down}-1)$ are time periods corresponding to the day. $(t_{down}+3)$ to $(t_{up}-2)$ the next day are time periods corresponding to the night. After determining the sunup time and the sundown time, the terminal may determine specific time periods corresponding to six views. For example, if the sunup time of a region corresponding to real-time location information a is 5:30, the terminal of the region displays a navigation interface corresponding to the morning at 5:30 to 7:30. If the sunup time of a region corresponding to real-time location information b is 6:00, the terminal of the region displays a navigation interface corresponding to the morning at 6:00 to 8:00, rather than displaying the same navigation view using a uniform time period. Accordingly, since the sunup time and the sundown time will change constantly, even if the terminals are located in the same region, the time periods corresponding to various scene views in different periods are different. For example, the time period corresponding to the morning in summer is earlier, and the time period corresponding to the morning in winter is later.

Step 502c: Determine the first scene view based on correspondences between the scene views and the time periods and a first time period indicated by the real-time time information.

The terminal determines the first scene view corresponding to the first navigation scene based on correspondences between the scene views and the time periods and a first time period among the time periods corresponding to the scene views indicated by the real-time time information. The terminal determines a time period where the real-time time information is located, namely, the first time period, from the time periods corresponding to multiple scene views.

After dividing the time periods corresponding to the scenes according to a preset time difference and the sunup and sundown times, the terminal determines the first scene view based on a correspondence of the scene views to the time periods (for example, a correspondence shown in step 502b) and the first time period (a time period to which the current time belongs) indicated by the real-time time information, whereby the scene view displayed by the terminal via the navigation interface is consistent with the actual environment where the terminal is located.

Schematically, the real-time location information obtained by terminal A is 116° 23'17"E and 39° 54'27"2N, and the real-time time information is 6:00 on Nov. 8, 2021. Terminal A determines that the sunup time of the place is 06:51 and the sundown time is 17:04 based on the longitude and latitude and date, and finally determines that the first scene view is dawn based on the time period of each scene. The real-time location information obtained by terminal B which is in the same time zone as terminal A is 86° 37'33"E and 42° 45'32"N, and the real-time time information is 6:00 on Nov. 8, 2021. Terminal B determines that the sunup time of the place is 08:55 and the sundown time is 18:51 based on the longitude and latitude and date, and finally determines that the first scene view is night based on the time period of each scene.

Step 503: Determine the first base map corresponding to the first scene view based on correspondences between scene views and base map styles.

Styles of base maps corresponding to navigation scenes of different scene views are different.

The navigation application is provided with base map styles corresponding to the scene views, and the terminal determines a first base map corresponding to the first scene view based on the correspondence between the scene views and the base map styles. The first base map is obtained by combining the base map style corresponding to the first scene view and a map corresponding to the real-time location information, and can reflect the actual environment where the user is currently located.

In one embodiment, the terminal also displays the navigation interface in combination with a current weather situation, thereby further improving the authenticity of the navigation interface. Before step 503, the navigation interface display method according to this embodiment of the present disclosure further includes the following steps.

The terminal determines a first scene weather based on the real-time location information and the real-time time information. Exemplarily, the first scene weather is the weather presented in the first scene view, and the first scene weather may also be described as the weather in the first navigation scene.

In some embodiments, the terminal transmits a weather information obtaining request to the background server. The weather information obtaining request includes the real-time location information. The background server queries weather information based on the request and transmits the weather information to the terminal. The terminal determines the first scene weather based on the weather information returned by the background server (for example, the first scene weather is determined based on information such as temperature, humidity, wind speed, rainfall, or snowfall). Alternatively, the terminal directly queries the weather information through a third-party platform so as to determine the first scene weather.

Step 503 further includes the following steps:

Step 503a: Determine the first base map corresponding to the first scene view and the first scene weather based on correspondences of the scene views and scene weathers to the base map styles, the base map styles corresponding to different scene weathers under the same scene view being different.

Schematically, under the same scene view, there are also base map styles corresponding to different scene weathers. For example, "the sun is just rising" specifically includes base map styles such as "the sun is just rising, sunny", "the sun is just rising, cloudy", "the sun is just rising, rainy", and "the sun is just rising, snowy".

After the terminal determines the first scene weather based on the real-time location information and the real-time time information, step 503a is performed.

Step 504: Determine the first sky box corresponding to the first scene view based on correspondences between the scene views and sky box styles.

Styles of sky boxes corresponding to navigation scenes of different scene views are different.

When considering the scene weather, step 504 further includes the following steps:

Step 504a: Determine the first sky box corresponding to the first scene view and the first scene weather based on correspondences of the scene views and the scene weathers to the sky box styles, the sky box styles corresponding to different scene weathers under the same scene view being different.

Schematically, under the same scene view, there are also sky box styles corresponding to different scene weathers. For example, "the sun is just rising" specifically includes sky box styles such as "the sun is just rising, sunny", "the sun is just rising, cloudy", "the sun is just rising, rainy", and "the sun is just rising, snowy". FIG. 6 shows a schematic diagram of a style index, showing a correspondence between scene views, scene weathers, style identifiers, and style descriptions.

After the terminal determines the first scene weather based on the real-time location information and the real-time time information, step 504a is performed. It is to be noted that the order of execution of step 503a and step 504a is not limited in this embodiment of the present disclosure.

Figures 7, 8:
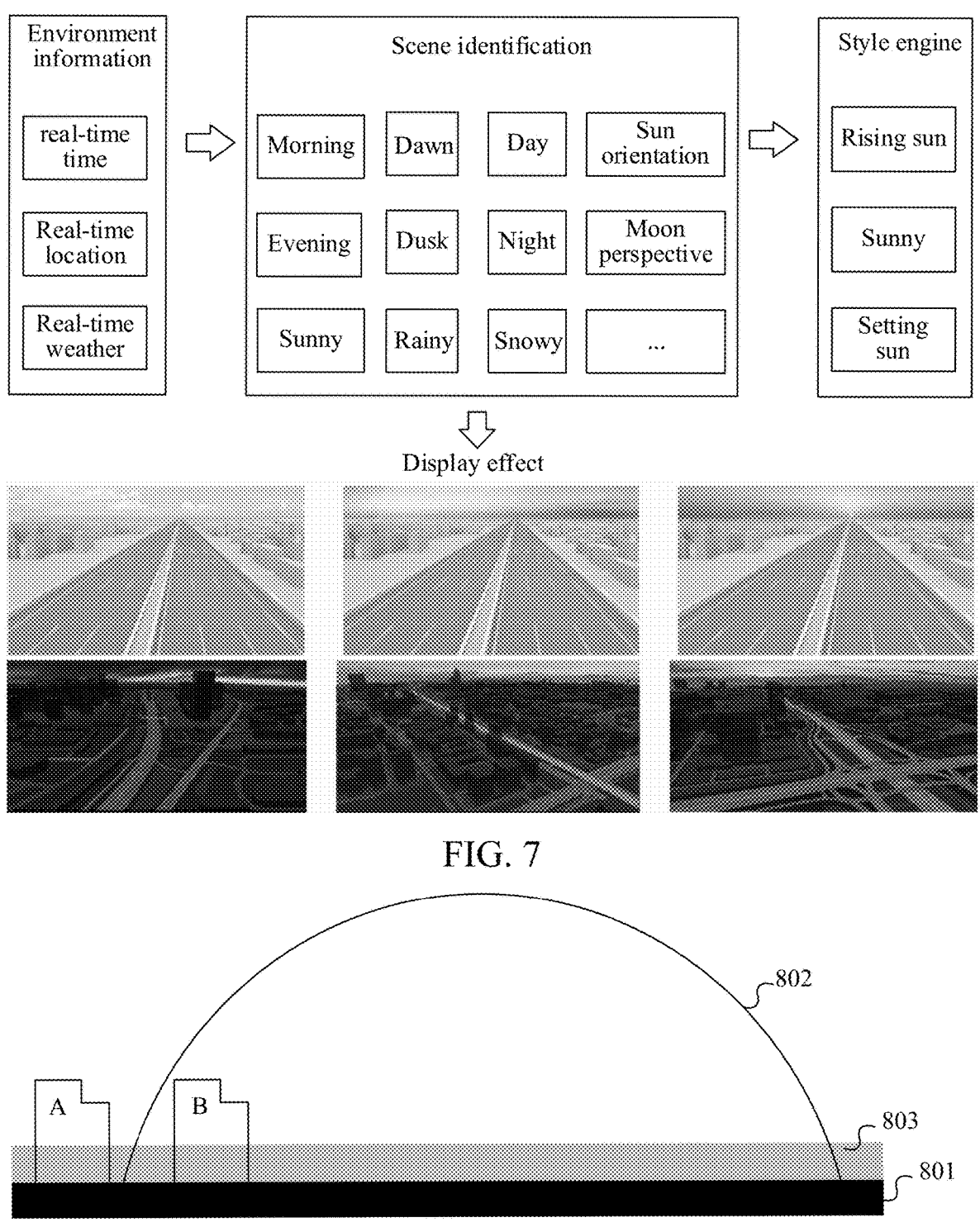
FIG. 7 is a schematic diagram of a display process of a navigation interface according to an exemplary embodiment of the present disclosure.
FIG. 8 is a schematic diagram of element fusion processing according to an exemplary embodiment of the present disclosure.

Schematically, FIG. 7 shows a schematic diagram of a process in which a terminal displays a navigation interface based on real-time environment information. The terminal determines a current scene based on information such as time, location, and weather, then searches for a first interface component corresponding to a navigation scene via a style engine, and finally fuses the first interface component to obtain the navigation interface. FIG. 7 shows display effects of three navigation scenes corresponding to a general navigation interface and a road-level navigation interface.

The order of execution of step 503 and step 504 is not limited in this embodiment of the present disclosure.

Step 505: Display a navigation interface obtained by fusing the first base map and the first sky box.

In one embodiment, when the terminal fuses the first base map and the first sky box, transition regions at a junction are fused, so as to solve the problem that the fusion effect of the base map and the sky box is poor and the transition is rigid. Step 505 includes the following steps:

Step 505*a*: Combine the first base map and the first sky box to obtain a first virtual scene.

After obtaining the first base map and the first sky box, the terminal first combines and concatenates the first base map and the first sky box in a manner that the base map is below the sky box, so as to obtain a complete model corresponding to the first virtual scene.

Step 505*b*: Transparently mix the transition region in the first virtual scene, the transparently-mixed transition region being displayed as a semi-transparent effect.

The terminal transparently mixes the transition region in the first virtual scene to obtain a processed first virtual scene, and the transparently-mixed transition region is displayed as a semi-transparent effect in the processed first virtual scene.

In one embodiment, the first base map is connected to the first sky box, and a region in a first height above a contact surface between the first base map and the first sky box is a transition region. The terminal determines a transition region based on the first virtual scene obtained by combining the first base map and the first sky box, and transparently mixes the transition region, thereby solving the problems that the transition is rigid and the stitching effect is poor.

Specifically, the terminal does not transparently mix the sky boxes and the base maps of all the transition regions in the field of view, but transparently mixes the boundary between the sky and the base in a captured picture based on a photographing perspective of a virtual camera.

As shown in FIG. 8, a first sky box 802 is located above a first base map 801. The terminal determines a transition region 803 based on a first height, and transparently mixes the transition region, whereby the transition region 803 is a semi-transparent region.

Step 505*c*: Display the navigation interface based on a navigation picture obtained by photographing the first virtual scene via a virtual camera.

The terminal displays the navigation interface based on a navigation picture obtained by photographing the processed first virtual scene via a virtual camera. In one embodiment, the sky box and the base map are both stereoscopic images, and the navigation picture in the navigation interface is obtained by the virtual camera photographing the first virtual scene according to a photographing angle. Step 505*c* further includes the following steps:

Step 1: Determine a skew angle of the virtual camera based on a skew angle adjustment range, a scale adjustment range, and a first scale, the first scale being determined based on a default scale and a received scaling operation.

The first scale is referred to as a current scale. Exemplarily, the current scale refers to a scale applied to a first navigation picture.

In one embodiment, after the terminal executes the navigation application, the navigation interface is displayed according to a default scale and a default skew angle. When the scaling operation of the user is received, the navigation interface is updated by adjusting the skew angle and the scale based on a scaling-down proportion or a scaling-up proportion indicated by the scaling operation. The first navigation picture may be a navigation picture after a picture scaling operation and/or a skew angle adjustment operation.

Figures 9, 10:
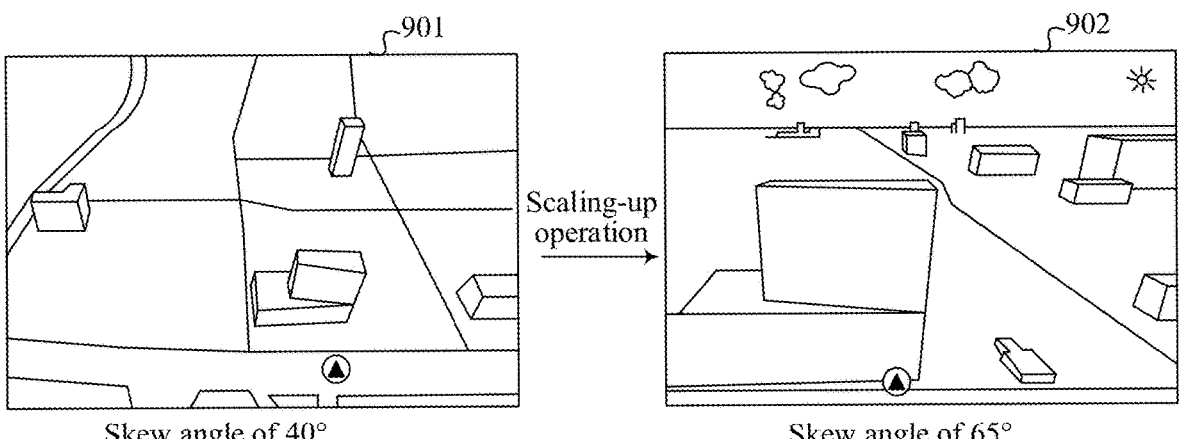
FIG. 9 is a schematic diagram of adjusting a skew angle and a scale of a navigation interface according to an exemplary embodiment of the present disclosure.
FIG. 10 is a schematic diagram of a scale index according to an exemplary embodiment of the present disclosure.

Exemplarily, as shown in FIG. 9, when receiving a scaling-up operation on the navigation picture, the terminal increases the skew angle and increases the scale based on the scaling-up proportion. That is, when the user scales down the map, the skew angle is enlarged, the sky box display region is increased, the base map display region is decreased, and an overhead perspective gradually approaches an eye level perspective. As shown in FIG. 9, the terminal initially displays a navigation interface 901 at a skew angle of 40° and a scale of 500 m, and displays a navigation interface 902 at a skew angle of 65° and a scale of 10,000 m based on a scaling-up proportion when a scaling-up operation is received from the user.

In one embodiment, the terminal determines the first scale based on a scaling proportion indicated by the scaling operation of the user (for example, the scaling proportion is determined based on a swipe distance of a two-finger reverse swipe operation). FIG. 10 shows a table of a correspondence between a scale level and an actual physical length. After the first scale is determined, the skew angle of the virtual camera is determined based on a skew angle calculation formula.

Assuming that the first scale is nScaleLevel, the skew angle $f_{SkewAngle}$ is calculated as follows.

$$f_{SkewAngle}=20+(nScaleLevel-ScaleLevel1)*\\ (Max_{SkewAngle}-Min_{SkewAngle})/(ScaleLevel2-\\ ScaleLevel1)$$

where $Min_{SkewAngle}$ is the minimum skew angle (referred to as "minimum angle"), $Max_{SkewAngle}$ is the maximum skew angle (referred to a "maximum angle"), and ScaleLevel2 is greater than ScaleLevel1.

For example, the scale adjustment range is scale level 13 to scale level 18 and the skew angle adjustment range is 20 to 50 degrees. Assuming that the first scale is nScaleLevel, $f_{SkewAngle}=20°$ when nScaleLevel<13; $f_{SkewAngle}=50°$ when nScaleLevel>18; and $f_{SkewAngle}=20+(nScaleLevel-13)*$ (50−20)/(18−13) when 13<nScaleLevel<18.

Step 2: Determine a display proportion of a first sky box display region to a maximum sky box display region based on a ratio of a first angle difference to a second angle difference, the first angle difference being an angle difference between the skew angle and a minimum angle in the skew angle adjustment range, and the second angle difference being an angle difference between a maximum angle and the minimum angle in the skew angle adjustment range.

Exemplarily, the first sky box display region is referred to as a current sky box display region. The first sky box display region refers to a sky box display region in the navigation picture corresponding to the first navigation scene.

Step 3: Determine a sky box display region of the first sky box and a base map display region of the first base map based on the display proportion and the maximum sky box display region.

Exemplarily, the sky box display region of the first sky box refers to the foregoing first sky box display region.

In one embodiment, the ratio of the sky box display region to the base map display region in the picture captured by the virtual camera at different skew angles is different. As the skew angle is larger, the sky ratio is larger, and the base map ratio is smaller.

Schematically, a display area of the sky box display region of the first sky box is calculated as follows.

$$f_{ratio}=Max_{ratio}*(f_{SkewAngle}-Min_{SkewAngle})/\\ (Max_{SkewAngle}-Min_{SkewAngle})$$

where $f_{ratio}$ is the area (or height) of the sky box display region of the first sky box, and $Max_{ratio}$ is the maximum display area (or height) of the sky box. Schematically, when the ratio of the sky box display region to the interface exceeds 0.5, the base map display region will be compressed, the real physical range of the base map display will also be compressed, the balance between sky and land cannot be achieved, and the navigation information that can be displayed in the interface is also less. Therefore, a developer sets the maximum ratio of the sky box display region to 0.5, namely, $Max_{ratio}$ is half of the navigation interface (or navigation picture).

Step 4: Semi-transparently process a virtual object having an intersection with the sky box display region in the display region of the first base map.

The terminal semi-transparently processes a virtual object having an intersection with the first sky box display region in the base map display region of the first base map to obtain the semi-transparently processed navigation picture.

A virtual object having an intersection with a sky box display region in the navigation picture is displayed as a semi-transparent effect, the sky box display region is determined based on a skew angle adjustment range, a scale adjustment range, and a scaling operation, and the scaling operation is configured to adjust a scale and a skew angle of the virtual camera.

In order to reduce the blocking of the sky box region by a building, the terminal hides a virtual object such as the building outside the field of view, and semi-transparently processes a virtual object having an intersection with the sky box display region in the display region in the field of view. As shown in FIG. 8, building A is located outside the field of view, and the terminal hides the building. Building B is located within the field of view, and the terminal determines whether there is an intersection with the sky box display region based on the skew angle of the current virtual camera. If yes, semi-transparent processing is performed thereon.

Step 5: Display the navigation interface based on the semi-transparently processed navigation picture.

After determining the sky box display region of the first sky box and the base map display region of the first base map, the terminal displays the navigation interface based on the semi-transparently processed navigation picture.

In another embodiment, the terminal also supports the presentation of a projection effect of the solar radiation on the base map, namely adding shadowing effects to buildings, public settings, vehicles, etc. in the base map. A direct solar radiation point moves between the Tropic of Capricorn and the Tropic of Cancer every year, and the sun rises in the east and sets in the west every day. Therefore, the solar radiation angle changes anytime and anywhere. The terminal determines a solar radiation angle based on the real-time time information and the real-time location information so as to determine the first shadow effect of the virtual object. Step 505 further includes the following steps:

Step 505*d*: Obtain a real-time solar altitude angle corresponding to the real-time time information and the real-time location information.

In one embodiment, step 505*d* includes the following steps:

Step 6: Determine a direct solar radiation latitude based on the date in the real-time time information.

Step 7: Determine the real-time solar altitude angle based on a real-time latitude in the real-time location information and the direct solar radiation latitude.

Figure 11:
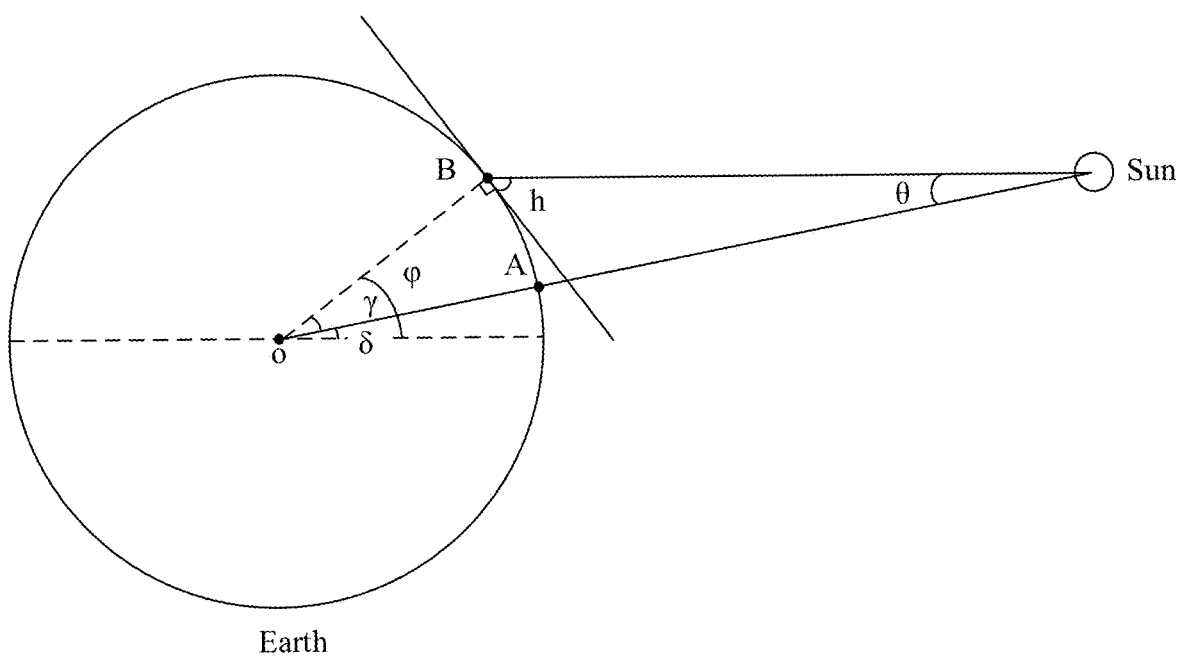
FIG. 11 is a schematic diagram of a solar altitude angle calculation model according to an exemplary embodiment of the present disclosure.

FIG. 11 shows a schematic diagram of a solar radiation map, where a solar altitude angle h of place B is taken as a solar incidence angle in the navigation scene. $\Phi$ is the latitude of place B (namely, real-time latitude), $\delta$ is the latitude of a current direct solar radiation point A (namely, the direct solar radiation latitude). $h+\theta+\gamma+90°=180°$, where $\gamma=\varphi-\delta$, and the distance of the sun from the earth is much larger than the radius of the earth, whereby $\theta$ is negligible.

Figure 12:
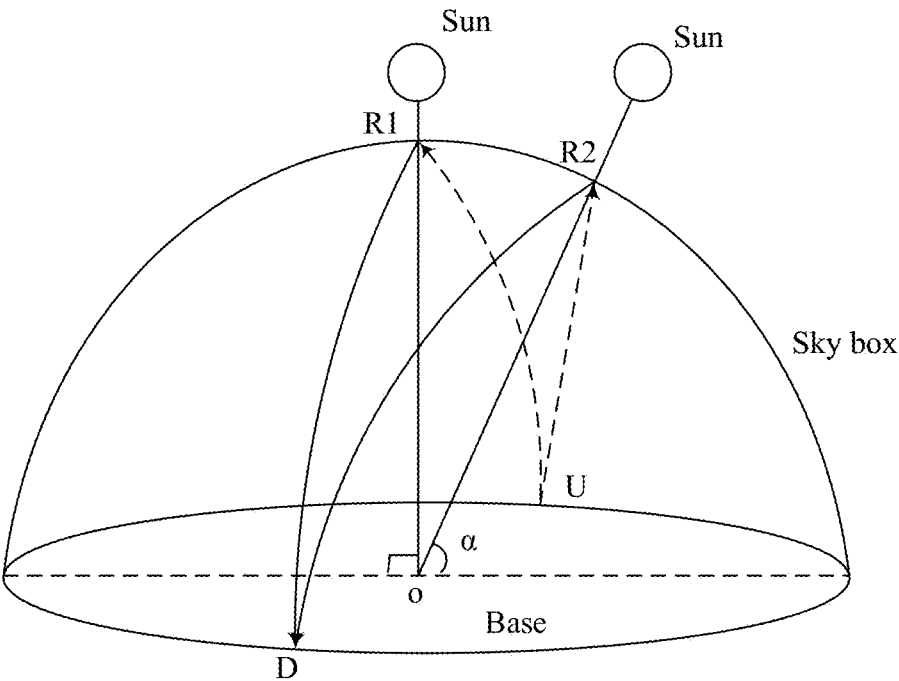
FIG. 12 is a schematic diagram of a solar altitude angle calculation model according to another exemplary embodiment of the present disclosure.

Therefore, the solar altitude angle h of place B is $h=90°-(\varphi-\delta)$. FIG. 12 shows a model corresponding to a navigation scene. When the sun directly radiates a base map plane, a movement locus of the sun rising in the east and setting in the west is U-R1-D, and a movement locus plane U-R1-D-O-U is perpendicular to the base map plane. When the sun does not directly radiate the base map plane, the locus of the sun rising in the east and setting in the west is U-R2-D, and an included angle between the movement locus plane U-R2-D-O-U and the base map plane is $\alpha$, where $\alpha$ corresponds to the solar altitude angle h of place B in FIG. 11.

Step 505*e*: Determine a first shadow effect of a virtual object on the first base map based on the real-time solar altitude angle, the real-time time information, and the real-time location information.

Step 505*f*: Display, according to the first shadow effect, the navigation interface obtained by fusing the first base map and the first sky box.

Based on the real-time solar altitude angle, the real-time time information, and the real-time location information, the terminal determines the orientation of the sun in the actual environment and the shadow effect of a ground object, and then determines the first shadow effect of the virtual object on the first base map. The navigation interface obtained by fusing the first base map and the first sky box is displayed according to the first shadow effect.

In this embodiment of the present disclosure, on the one hand, the terminal transparently mixes the intersection of the sky box and the base map, and semi-transparently processes the virtual object in the transition region, whereby the fusion of the sky and the ground in the navigation interface is more natural, and the boundary is avoided to be too clear. On the other hand, the solar altitude angle and the sunup and sundown times are determined based on the real-time time information and the real-time location information, whereby the time period of each scene view is more in line with the local situation, and the shadow effect of the virtual object can be determined based on the solar altitude angle, while external information such as weather is added to enrich the navigation scene, so as to solve the problem of large environmental differences in different regions, and make the navigation interface more realistic and consistent with the actual environment.

The foregoing embodiments show how the terminal displays the navigation interface based on the real-time environment information. Obtaining real-time information required by the terminal through a network connection cloud service is a standard solution. However, the user may be in a complex network situation at any time in a real-time environment. For example, in a region with no network signal or weak signal, such as a tunnel, a normal response of the background server cannot be obtained, or a satellite signal cannot even be received. This embodiment of the present disclosure provides two policies for obtaining the real-time environment information, namely, an online policy and an offline policy, so as to solve the problem that the style of the navigation interface cannot be switched in time in response to poor network quality. FIG. 13 shows a flowchart of a navigation interface display method according to another exemplary embodiment of the present disclosure. This embodiment describes an example in which the method is applied to a terminal executing a navigation application. The method includes the following steps:

Step 1301: Determine a navigation interface update policy based on a first network quality, the navigation interface update policy including an online policy and an offline policy.

The first network quality refers to a current network quality. The current network quality refers to a network quality when the navigation interface is updated.

In one embodiment, the navigation interface update policy is determined based on the first network quality. When the network quality is good, the online policy is adopted to obtain the real-time environment information and the first interface component from the background server, so as to improve the accuracy of the real-time environment information and reduce terminal power consumption. When the network quality is poor, the offline policy is adopted to obtain or calculate the real-time environment information locally, so as to ensure the timeliness of navigation interface update. Step 1301 specifically includes the following steps:

Step 1301a: Transmit a network quality detection request to a background server in response to a navigation interface update instruction.

When receiving the navigation interface update instruction, the terminal transmits the network quality detection request to the background server, and requests the cloud network speed detection service to check the network condition of the terminal. In some embodiments, when receiving a trigger operation of the user on the navigation interface, the terminal determines that the navigation interface update instruction is received. When an interface update time cycle is reached, the terminal determines that the navigation interface update instruction is received. This embodiment of the present disclosure is not limited thereto.

In one embodiment, step 1301a further includes the following steps:

Step 8: Obtain local environment information.

The local environment information includes local location information and local time information.

Step 9: Transmit the network quality detection request and an information obtaining request to the background server, the information obtaining request including the local environment information, and the background server being configured to determine cloud environment information based on the local environment information and transmit the cloud environment information to the terminal in response to that the network quality is normal.

The terminal transmits a network quality detection request carrying local environment information and a network signal to the background server, and requests to obtain accurate location information and time information when the network quality is good. For example, the terminal transmits a local system time, a base station signal, and/or a wireless fidelity (WiFi) signal to the server, and the background server determines cloud environment information, such as the location of the terminal, based on the base station signal and/or the WiFi signal as well as a positioning service.

Step 1301b: Determine that the navigation interface update policy is the online policy in response to receiving a network quality detection response transmitted by the background server and the network quality detection response indicating that a network quality is normal.

Step 1301c: Determine that the navigation interface update policy is the offline policy in response to receiving the network quality detection response and the network quality being abnormal, or not receiving the network quality detection response within a first duration.

When the network quality is good, the terminal adopts the online policy. For example, the background server feeds back a current network speed to the terminal, and the terminal determines a policy to be adopted based on the current network speed and a network speed threshold. If the current network speed is higher than the network speed threshold, the online policy is adopted. If the current network speed is lower than the network speed threshold, the offline policy is adopted.

In one embodiment, when the background server determines that the network quality of the terminal is good, the real-time environment information is transmitted to the terminal while the network quality detection response is returned, so as to simplify the interaction process between the terminal and the background server and improve the interface update efficiency.

Accordingly, when the network quality is poor, the terminal adopts the offline policy.

Step 1302: Obtain the real-time environment information through the navigation interface update policy.

After determining the navigation interface update policy, the terminal obtains the real-time environment information based on an information obtaining logic corresponding to the corresponding policy. Step 1302 specifically includes the following steps:

Step 1302a: Determine the real-time environment information based on the local environment information and the cloud environment information in the network quality detection response in response to the navigation interface update policy being the online policy.

In one embodiment, the local time information includes a terminal system time and a global positioning system (GPS) time, and cloud time information in the cloud environment information is a server time. When an online policy is adopted, the process of obtaining real-time time information includes: determining the terminal system time as a real-time time in response to a time difference between any two of the terminal system time, the server time, and the GPS time being less than a time difference threshold; determining the GPS time as the real-time time in response to the time difference between the terminal system time and the GPS time being greater than the time difference threshold; and determining the server time as the real-time time in response to not obtaining the GPS time and the time difference between the terminal system time and the server time being greater than the time difference threshold.

The terminal obtains the system time from a local system, obtains the GPS time from the GPS positioning signal, and obtains the server time from the background server when performing network quality check. Then, the difference of the three times is checked. In response to small differences among the three times, the local system time is used as the basis. In response to large differences among the three times, the GPS time is preferentially used. If the GPS time is not obtained, the server time is used. Accordingly, if both the GPS time obtained by the terminal and the server time fail, the policy is switched to the offline policy, and the terminal system time is directly determined as the real-time time.

In one embodiment, cloud location information in the cloud environment information is a server-determined positioning location. When an online policy is adopted, the process of obtaining real-time location information includes: determining the server-determined positioning location as a real-time location.

The terminal obtains a server-determined positioning location based on an online location service, and determines the server-determined positioning location as the real-time location if the server-determined positioning location is obtained successfully. The policy is switched to the offline policy if the server-determined positioning location is obtained unsuccessfully.

Step 1302*b*: Determine the local environment information as the real-time environment information in response to the navigation interface update policy being the offline policy.

In one embodiment, the local time information includes a terminal system time and a GPS time. When an offline policy is adopted, the process of obtaining real-time time information includes: determining the terminal system time as the real-time time in response to not obtaining the GPS time or a time difference between the GPS time and the terminal system time being less than a time difference threshold; and determining the GPS time as the real-time time in response to the time difference between the terminal system time and the GPS time being greater than the time difference threshold.

When the connection between the terminal and the background server fails, the terminal determines the real-time time based on the system time and the GPS time. That is, the GPS time is preferentially used. When the GPS signal is obtained unsuccessfully, the local system time is used as the basis.

In one embodiment, the local location information includes a GPS positioning location and a historical positioning location. When an offline policy is adopted, the process of obtaining real-time location information includes: determining the GPS positioning location as the real-time location in response to obtaining the GPS positioning location; determining a last positioning location in the historical positioning location as the real-time location in response to not obtaining the GPS positioning location; and determining a default navigation location as the real-time location in response to not obtaining the GPS positioning location and in the absence of the historical positioning location.

The terminal obtains the GPS positioning location based on the GPS signal. If the GPS positioning location is obtained unsuccessfully, it is checked whether to save a historical location. If the historical location is saved, the previous location is returned. If the historical location is not saved, a default location of the navigation application is used.

In another embodiment, the terminal also needs to obtain real-time weather information. When the online policy is adopted, the terminal requests to obtain the real-time weather information, the sunup time, the sundown time, and information such as travel suggestions from the background server. When the request fails or the offline policy is adopted, the terminal uses default weather information (for example, sunny days) and calculates the sunup time and the sundown time.

Step 1303: Determine a first interface component based on a first navigation scene corresponding to the real-time environment information.

In some embodiments, when the navigation interface update policy is the offline policy, the terminal obtains the first interface component corresponding to the real-time environment information from a local element library based on a correspondence of navigation scenes to interface components. When the navigation interface update policy is the online policy, the terminal transmits an element obtaining request containing real-time environment information to the background server, and the background server transmits the latest first interface component corresponding to the real-time environment information to the terminal, or after determining the real-time environment information of the terminal in the foregoing steps, the background server directly transmits the first interface component to the terminal when feeding back the real-time environment information. This embodiment of the present disclosure is not limited thereto.

Step 1304: Display a navigation interface obtained by fusing the first base map and the first sky box.

Example embodiments of step 1303 to step 1304 are similar to those of the foregoing step 202 to step 203, and will not be described in detail in this embodiment of the present disclosure.

In this embodiment of the present disclosure, the online policy and the offline policy are provided to update the navigation interface, and the problem that the navigation interface style cannot be switched in time in response to that no network is solved by offline fusion.

Figure 14:
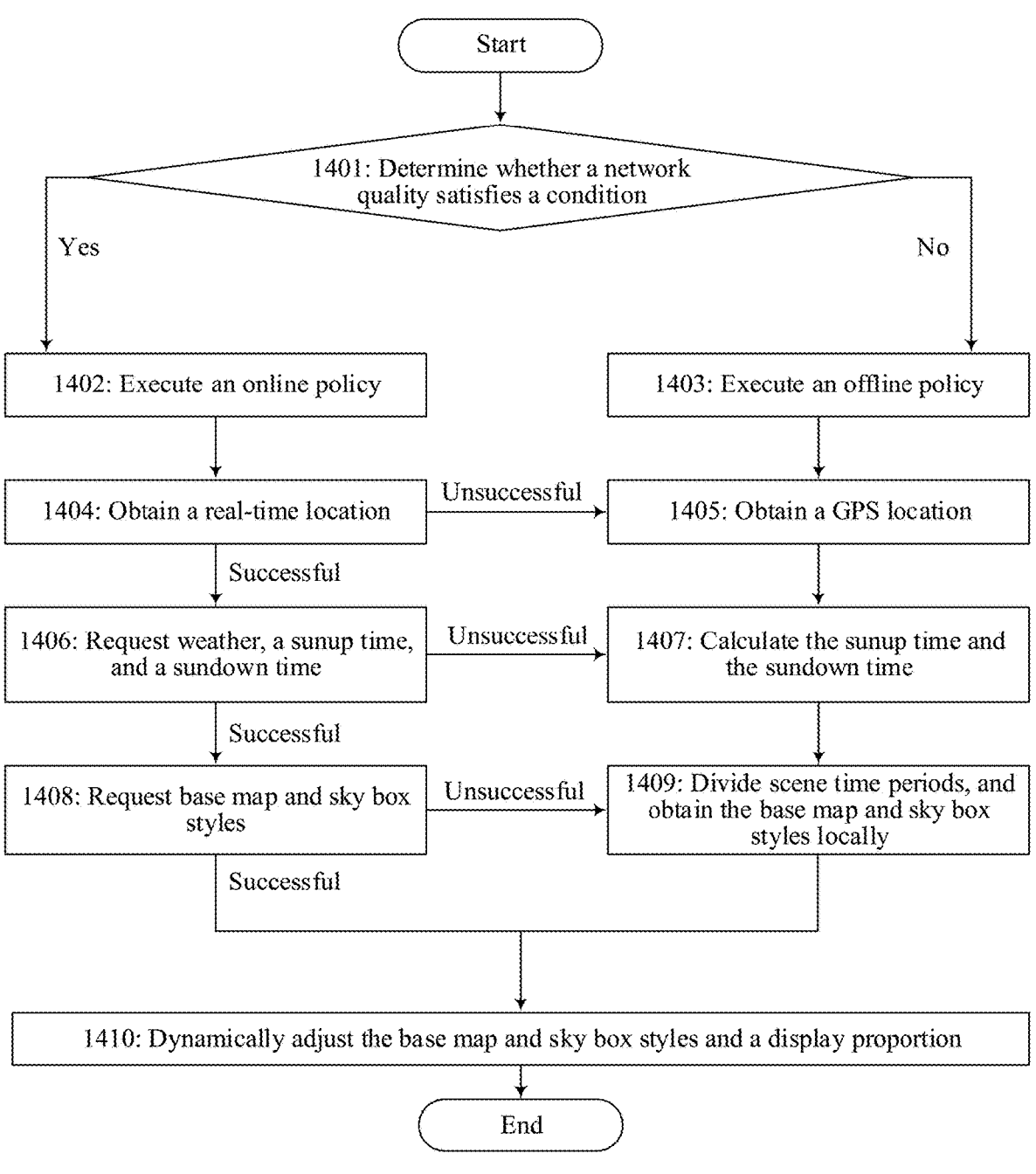
FIG. 14 shows a flowchart of a navigation interface display method according to a further exemplary embodiment of the present disclosure.

In connection with the foregoing embodiments, in a schematic example, the process of performing a navigation interface display task by the terminal is shown in FIG. 14. The process includes the following steps:

Step 1401: Determine whether a network quality satisfies a condition. If yes, step 1402 is performed. If no, step 1403 is performed.

Step 1402: Execute an online policy.

Step 1403: Execute an offline policy.

Step 1404: Obtain a real-time location. If the real-time location is obtained unsuccessfully, step 1405 is performed to obtain a GPS location. If the real-time location is obtained successfully, step 1406 is performed next.

Step 1405: Obtain the GPS location.

Step 1406: Request weather, a sunup time, and a sundown time. If the request fails, step 1407 is performed to calculate the sunup time and the sundown time. If the request is successful, step 1408 is performed next.

Step 1407: Calculate the sunup time and the sundown time.

Step 1408: Request base map and sky box styles. If the request fails, step 1409 is performed to divide scene time periods and obtain the base map and sky box styles locally. If the request is successful, step 1410 is performed next.

Step 1409: Divide the scene time periods, and obtain the base map and sky box styles locally.

Step 1410: Dynamically adjust the base map and sky box styles and a display proportion.

In one embodiment, the navigation interface display method in the foregoing embodiments may be applied to a navigation application. The navigation application may be a stand-alone application or a program assembly run by and depending on other types of applications/web pages. For example, when the user starts a vehicle-mounted navigation in a vehicle during driving, or triggers to update a navigation interface, the terminal transmits a network quality detection request to the background server, and determines to update the navigation interface using the online policy or the offline policy based on a network quality detection result. The terminal obtains real-time environment information such as real-time time information, real-time location information, and real-time weather information via the corresponding policy, determines the current real environment of the terminal based on the real-time environment information, and then determines interface components corresponding to the real environment, namely, a first sky box and a first base map. The first sky box and the first base map can reflect the view, weather, and the like of the real environment where the terminal is located. Styles of the interface components are determined based on the real-time environment information so as to display the navigation interface, whereby the navigation interface can reflect the real environment where the user is currently located, thereby avoiding the situation where the navigation scene displayed by the terminal in some regions does not match an actual scene when a uniform interface switching mode is used due to different time differences and climates. In this way, the user can also perceive an external real environment in real-time time in the vehicle.

Figure 15:
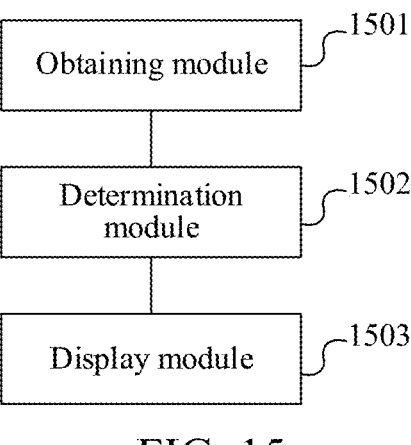
FIG. 15 shows a structural block diagram of a navigation interface display apparatus according to an exemplary embodiment of the present disclosure.

FIG. 15 is a structural block diagram of a navigation interface display apparatus according to an exemplary embodiment of the present disclosure. The apparatus includes the following components:

an obtaining module 1501, configured to obtain real-time environment information, the real-time environment information including real-time location information and real-time time information;

a determination module 1502, configured to determine a first interface component based on a first navigation scene corresponding to the real-time environment information, the first interface component including a first base map and a first sky box, the first base map indicating a road surface environment, the first sky box indicating a sky environment, and styles of interface components corresponding to different navigation scenes being different; and a display module 1503, configured to display a navigation interface obtained by fusing the first base map and the first sky box.

In some embodiments, the determination module 1502 includes:

a first determination unit, configured to determine a first scene view corresponding to the first navigation scene based on the real-time location information and the real-time time information;

a second determination unit, configured to determine the first base map corresponding to the first scene view based on correspondences between scene views and base map styles, styles of base maps corresponding to navigation scenes of different scene views being different; and a third determination unit, configured to determine the first sky box corresponding to the first scene view based on correspondences between the scene views and sky box styles, styles of sky boxes corresponding to navigation scenes of different scene views being different.

In some embodiments, the first determination unit is further configured to:

determine a sunup time and a sundown time corresponding to a real-time location based on latitude and longitude in the real-time location information and a date in the real-time time information;

determine time periods corresponding to scene views based on the sunup time, the sundown time, time differences between time periods corresponding to the scene views and the sunup time, and time differences between the time periods corresponding to the scene views and the sundown time; and determine the first scene view based on correspondences between the scene views and the time periods and a first time period among the time periods corresponding to the scene views indicated by the real-time time information.

In some embodiments, the second determination unit is further configured to:

determine a first scene weather corresponding to the first scene view based on the real-time location information and the real-time time information; and determine the first base map corresponding to the first scene view and the first scene weather based on correspondences of the scene views and scene weathers to the base map styles, the base map styles corresponding to different scene weathers under the same scene view being different.

The third determination unit is further configured to:

determine the first sky box corresponding to the first scene view and the first scene weather based on correspondences of the scene views and the scene weathers to the sky box styles, the sky box styles corresponding to different scene weathers under the same scene view being different.

In some embodiments, the first base map is connected to the first sky box, and a region in a first height above a contact surface between the first base map and the first sky box is a transition region.

The display module 1503 includes:

a combination unit, configured to combine the first base map and the first sky box to obtain a first virtual scene;

a processing unit, configured to transparently mix the transition region in the first virtual scene, the transparently-mixed transition region being displayed as a semi-transparent effect; and a first display unit, configured to display the navigation interface based on a navigation picture obtained by photographing the first virtual scene via a virtual camera.

In some embodiments, a virtual object having an intersection with a sky box display region in the navigation picture is displayed as a semi-transparent effect, the sky box display region is determined based on a skew angle adjustment range, a scale adjustment range, and a scaling operation, and the scaling operation is configured to adjust a scale and a skew angle of the virtual camera.

In some embodiments, the first display unit is further configured to:

determine a skew angle of the virtual camera based on a skew angle adjustment range, a scale adjustment range, and a first scale, the first scale being determined based on a default scale and a received scaling operation;

determine a display proportion of a first sky box display region to a maximum sky box display region based on a ratio of a first angle difference to a second angle difference, the first angle difference being an angle difference between the skew angle and a minimum angle in the skew angle adjustment range, and the second angle difference being an angle difference between a maximum angle and the minimum angle in the skew angle adjustment range;

determine a sky box display region of the first sky box and a base map display region of the first base map based on the display proportion and the maximum sky box display region;

semi-transparently process a virtual object having an intersection with the sky box display region in the base map display region of the first base map to obtain the semi-transparently processed navigation picture; and display the navigation interface based on the semi-transparently processed navigation picture.

In some embodiments, the display module 1503 includes:

a first obtaining unit, configured to obtain a real-time solar altitude angle corresponding to the real-time time information and the real-time location information;

a fourth determination unit, configured to determine a first shadow effect of a virtual object on the first base map based on the real-time solar altitude angle, the real-time time information, and the real-time location information; and a second display unit, configured to display, according to the first shadow effect, the navigation interface obtained by fusing the first base map and the first sky box.

In some embodiments, the obtaining unit is further configured to:

determine a direct solar radiation latitude based on the date in the real-time time information; and determine the real-time solar altitude angle based on a real-time latitude in the real-time location information and the direct solar radiation latitude.

In some embodiments, the obtaining module 1501 includes:

a fifth determination unit, configured to determine a navigation interface update policy based on a first network quality, the navigation interface update policy including an online policy and an offline policy; and a second obtaining unit, configured to obtain the real-time environment information through the navigation interface update policy.

In some embodiments, the fifth determination unit is further configured to:

transmit a network quality detection request to a background server in response to a navigation interface update instruction;

determine that the navigation interface update policy is the online policy in response to receiving a network quality detection response transmitted by the background server and the network quality detection response indicating that a network quality is normal; and determine that the navigation interface update policy is the offline policy in response to receiving the network quality detection response and the network quality being abnormal, or not receiving the network quality detection response within a first duration.

In some embodiments, the fifth determination unit is further configured to:

obtain local environment information; and transmit the network quality detection request and an information obtaining request to the background server, the information obtaining request including the local environment information, and the background server being configured to determine cloud environment information based on the local environment information and transmit the cloud environment information to the terminal in response to that the network quality is normal.

The second obtaining unit is further configured to:

determine the real-time environment information based on the local environment information and the cloud environment information in the network quality detection response in response to the navigation interface update policy being the online policy; and determine the local environment information as the real-time environment information in response to the navigation interface update policy being the offline policy.

In some embodiments, the local environment information includes local time information, the local time information includes a terminal system time and a GPS time, and cloud time information in the cloud environment information is a server time.

The second obtaining unit is further configured to:

determine the terminal system time as a real-time time in response to a time difference between any two of the terminal system time, the server time, and the GPS time being less than a time difference threshold;

determine the GPS time as the real-time time in response to the time difference between the terminal system time and the GPS time being greater than the time difference threshold; and determine the server time as the real-time time in response to not obtaining the GPS time and the time difference between the terminal system time and the server time being greater than the time difference threshold.

In some embodiments, the local environment information includes local time information, and the local time information includes a terminal system time and a GPS time.

The second obtaining unit is further configured to:

determine the terminal system time as the real-time time in response to not obtaining the GPS time or a time difference between the GPS time and the terminal system time being less than a time difference threshold; and determine the GPS time as the real-time time in response to the time difference between the terminal system time and the GPS time being greater than the time difference threshold.

In some embodiments, cloud location information in the cloud environment information is a server-determined positioning location.

The second obtaining unit is further configured to:

determine the server-determined positioning location as a real-time location.

In some embodiments, the local environment information includes local location information, and the local location information includes a GPS positioning location and a historical positioning location.

The second obtaining unit is further configured to:

determine the GPS positioning location as the real-time location in response to obtaining the GPS positioning location;

determine a last positioning location in the historical positioning location as the real-time location in response to not obtaining the GPS positioning location; and determine a default navigation location as the real-time location in response to not obtaining the GPS positioning location and in the absence of the historical positioning location.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 16:
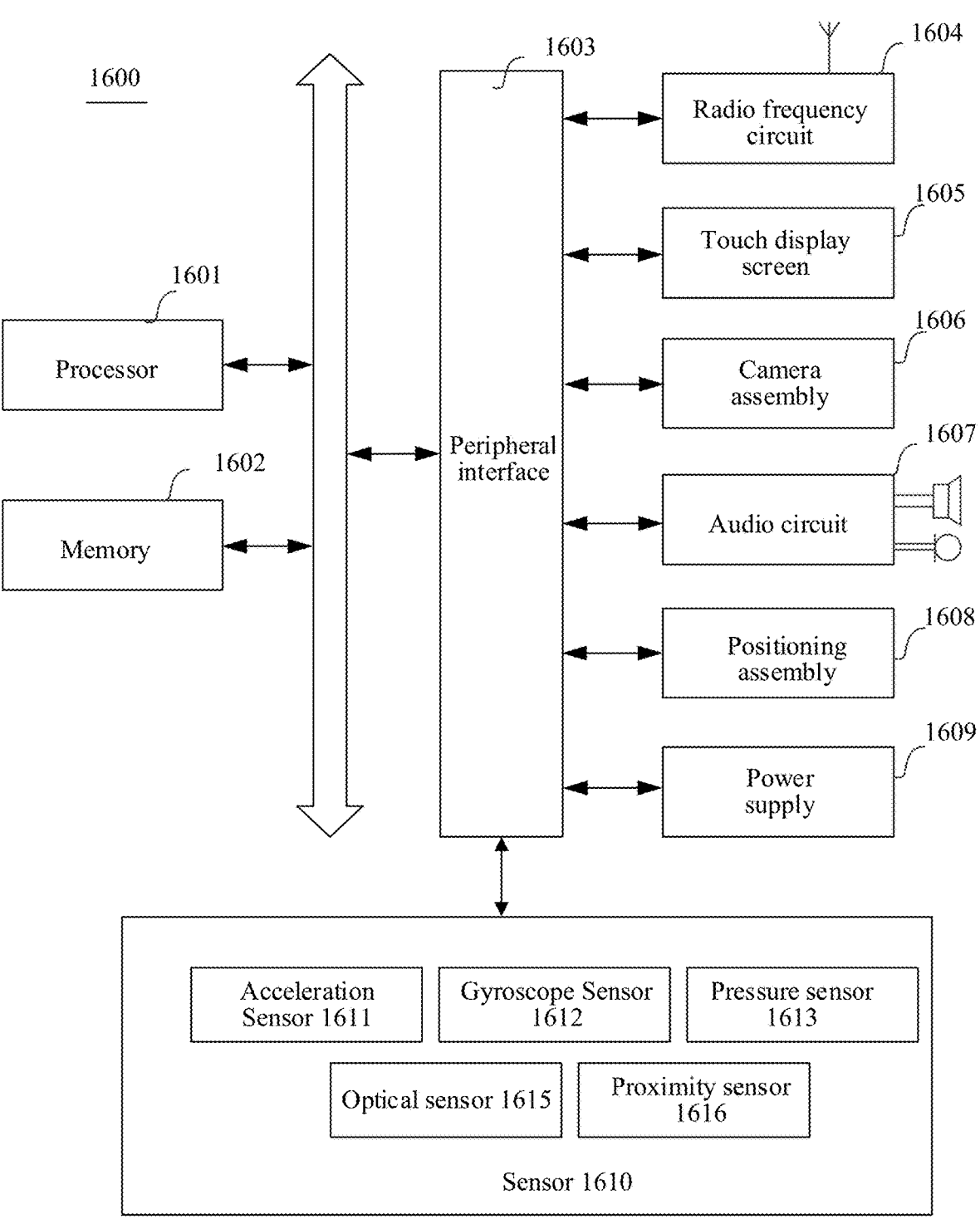
FIG. 16 shows a structural block diagram of a terminal according to an exemplary embodiment of the present disclosure.

FIG. 16 is a structural block diagram of a terminal 1600 according to an exemplary embodiment of the present disclosure. The terminal 1600 may be a portable mobile terminal, such as a smartphone, a tablet personal computer, a moving picture experts group audio layer III (MP3) player, or a moving picture experts group audio layer IV (MP4) player. The terminal 1600 may also be referred to as a user equipment, a portable terminal, or another name.

Generally, the terminal 1600 includes: a processor 1601 and a memory 1602.

The processor 1601 may include one or more processing cores, for example, a 4-core processor or an 8-core processor. The processor 1601 may be implemented in at least one hardware form of a digital signal processor (DSP), a field-programmable gate array (FPGA), and a programmable logic array (PLA). The processor 1601 may further include a main processor and a co-processor. The main processor is a processor for processing data in a wake-up state, and is also referred to as a central processing unit (CPU). The co-processor is a low-power processor for processing data in a standby state. In some embodiments, the processor 1601 may be integrated with a graphics processing unit (GPU). The GPU is responsible for rendering and drawing content to be displayed by a display screen. In some embodiments, the processor 1601 may further include an artificial intelligence (AI) processor. The AI processor is configured to process computing operations related to machine learning.

The memory 1602 may include one or more computer-readable storage media. The computer-readable storage media may be tangible and non-transitory. The memory 1602 may further include a high-speed random access memory and a nonvolatile memory, for example, one or more disk storage devices or flash storage devices. In some embodiments, the non-transitory computer-readable storage medium in the memory 1602 is configured to store at least one instruction. The at least one instruction is used for execution by the processor 1601 to implement the method according to the foregoing embodiment of the present disclosure.

In some embodiments, the terminal 1600 may further include: a peripheral interface 1603 and at least one peripheral. Specifically, the peripheral includes: at least one of a radio frequency (RF) circuit 1604, a touch display screen 1605, a camera assembly 1606, an audio circuit 1607, a positioning assembly 1608, and a power supply 1609.

The peripheral interface 1603 may be configured to connect the at least one peripheral related to input/output (I/O) to the processor 1601 and the memory 1602. In some embodiments, the processor 1601, the memory 1602, and the peripheral interface 1603 are integrated on the same chip or circuit board. In some other embodiments, any one or two of the processor 1601, the memory 1602 and the peripheral interface 1603 may be implemented on a separate chip or circuit board. This is not limited by this embodiment.

The RF circuit 1604 is configured to receive and transmit an RF signal, also referred to as an electromagnetic signal. The RF circuit 1604 communicates with a communication network and other communication devices through the electromagnetic signal. The RF circuit 1604 converts an electrical signal into the electromagnetic signal for transmission, or converts the received electromagnetic signal into the electrical signal. In some embodiments, the RF circuit 1604 includes: an antenna system, an RF transceiver, one or more amplifiers, a tuner, an oscillator, a digital signal processor, a codec chip set, a subscriber identity module card, and the like. The RF circuit 1604 may communicate with other terminals through at least one wireless communication protocol. The wireless communication protocol includes, but is not limited to: World Wide Web, metropolitan area networks, Intranets, generations of mobile communication networks (2G, 3G, 4G, and 5G), wireless local area networks, and/or WiFi networks.

The touch display screen 1605 is configured to display a user interface (UI). The UI may include a graph, text, an icon, a video, and any combination thereof. The touch display screen 1605 also has the ability to collect a touch signal at or above the surface of the touch display screen 1605. The touch signal may be inputted to the processor 1601 as a control signal for processing. The touch display screen 1605 is configured to provide virtual buttons and/or virtual keyboards, also referred to as soft buttons and/or soft keyboards. In some embodiments, there may be one touch display screen 1605 disposed on a front panel of the terminal

1600. In some other embodiments, there may be at least two touch display screens 1605 respectively disposed on different surfaces of the terminal 1600 or in a folded design. In still other embodiments, the touch display screen 1605 may be a flexible display screen disposed on a curved or folded surface of the terminal 1600. Even further, the touch display screen 1605 may be arranged in a non-rectangular irregular pattern, namely a special-shaped screen. The touch display screen 1605 may be made of materials such as a liquid crystal display (LCD) and an organic light-emitting diode (OLED).

The camera assembly 1606 is configured to capture images or videos. In some embodiments, the camera assembly 1606 includes a front camera and a rear camera. Generally, the front camera is configured to realize video call or selfie, and the rear camera is configured to capture photos or videos. In some embodiments, there are at least two rear cameras: any one of a main camera, a depth-of-field camera, and a wide-angle camera, so as to realize the fusion of the main camera and the depth-of-field camera to realize a bokeh function, and the fusion of the main camera and the wide-angle camera to realize a panoramic photographing and a virtual reality (VR) photographing function. In some embodiments, the camera assembly 1606 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1607 is configured to provide an audio interface between a user and the terminal 1600. The audio circuit 1607 may include a microphone and a speaker. The microphone is configured to acquire sound waves of a user and an environment, and convert the sound waves into an electrical signal to input to the processor 1601 for processing, or input to the radio frequency circuit 1604 for implementing voice communication. For the purpose of stereo acquisition or noise reduction, there may be multiple microphones disposed at different parts of the terminal 1600 respectively. The microphones may also be array microphones or omni-directional acquisition type microphones. The speaker is configured to convert electrical signals from the processor 1601 or the radio frequency circuit 1604 into sound waves. The speaker may be a film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1607 may further include a headphone jack.

The positioning assembly 1608 is configured to position a current geographic location of the terminal 1600 to enable navigation or location based services (LBS).

The power supply 1609 is configured to supply power to components in the terminal 1600. The power supply 1609 may be alternating current, direct current, disposable or rechargeable batteries. When the power supply 1609 includes a rechargeable battery, and the rechargeable battery may be a wired rechargeable battery or a wireless rechargeable battery. The wired rechargeable battery is a battery charged through a wired circuit, and the wireless rechargeable battery is a battery charged through a wireless coil. The rechargeable battery may be further configured to support a fast charging technology.

In some embodiments, the terminal 1600 further includes one or more sensors 1610. The one or more sensors 1610 include, but are not limited to, an acceleration sensor 1611, a gyroscope sensor 1612, a pressure sensor 1613, an optical sensor 1615, and a proximity sensor 1616.

The acceleration sensor 1611 may detect the magnitude of accelerations on three coordinate axes of a coordinate system established with the terminal 1600. For example, the acceleration sensor 1611 may be configured to detect the component of gravitational acceleration on the three coordinate axes. The processor 1601 may control the touch display screen 1605 to display the UI in a horizontal view or a vertical view according to a gravity acceleration signal collected by the acceleration sensor 1611.

The gyroscope sensor 1612 may detect a body direction and a rotation angle of the terminal 1600. The gyroscope sensor 1612 may cooperate with the acceleration sensor 1611 to acquire a 3D action by the user on the terminal 1600. The processor 1601 may realize the following functions based on data collected by the gyroscope sensor 1612: motion sensing (such as changing the UI according to a tilting operation of the user), image stabilization at the time of photographing, game control, and inertial navigation.

The pressure sensor 1613 may be disposed on a side frame of the terminal 1600 and/or a lower layer of the touch display screen 1605. When the pressure sensor 1613 is disposed on the side frame of the terminal 1600, a grip signal of the user to the terminal 1600 may be detected, and left or right hand recognition or quick operations may be performed according to the grip signal. When the pressure sensor 1613 is disposed on the lower layer of the touch display screen 1605, an operable control on the UI may be controlled according to a pressure operation of the user on the touch display screen 1605. The operable control includes at least one of a button control, a scroll-bar control, an icon control, and a menu control.

The optical sensor 1615 is configured to acquire ambient light intensity. In one embodiment, the processor 1601 may control the display brightness of the touch display screen 1605 according to ambient light intensity collected by the optical sensor 1615. Specifically, when the ambient light intensity is high, the display brightness of the touch display screen 1605 is turned up. When the ambient light intensity is low, the display brightness of the touch display screen 1605 is turned down. In another embodiment, the processor 1601 may further dynamically adjust a photographing parameter of the camera assembly 1606 according to the ambient light intensity collected by the optical sensor 1615.

The proximity sensor 1616, also referred to as a distance sensor, is typically disposed on the front of the terminal 1600. The proximity sensor 1616 is configured to collect a distance between the user and the front of the terminal 1600. In one embodiment, when the proximity sensor 1616 detects that the distance between the user and the front of the terminal 1600 is gradually reduced, the processor 1601 controls the touch display screen 1605 to switch from a screen-on state to a screen-off state. When the proximity sensor 1616 detects that the distance between the user and the front of the terminal 1600 is gradually increased, the touch display screen 1605 is controlled by the processor 1601 to switch from the screen-off state to the screen-on state.

It is to be understood by a person skilled in the art that the structure shown in FIG. 16 is not limiting of the terminal 1600 and may include more or fewer assemblies than illustrated, or some assemblies may be combined, or different assembly arrangements may be employed.

This embodiment of the present disclosure also provides a computer-readable storage medium. The computer-readable storage medium stores at least one computer instruction. The at least one computer instruction is loaded and executed by a processor to implement the navigation interface display method according to the above embodiments.

According to an aspect of the present disclosure, a computer program product or computer program is provided. The computer program product or computer program includes computer instructions. The computer instructions are stored in a computer-readable storage medium. A processor of a terminal reads the computer instructions from the computer-readable storage medium. The processor executes the computer instructions to cause the terminal to perform the navigation interface display method according to the various example implementations in the foregoing aspects.

It is to be understood that relevant data such as real-time environment information of the terminal, namely real-time time information, real-time location information, and real-time weather information is involved in the specific implementations of the present disclosure. When the above embodiments of the present disclosure are applied to a particular product or technology, user approval or consent is required, and collection, use and processing of the relevant data is required to comply with relevant national and regional laws and regulations and standards.

What is claimed is:

1. A navigation interface display method, performed by a terminal, the method comprising:

obtaining real-time environment information, the real-time environment information comprising real-time location information and real-time time information;

determining a first interface component based on a first navigation scene corresponding to the real-time environment information, the first interface component comprising a first base map and a first sky box, the first base map indicating a road surface environment, the first sky box indicating a sky environment, styles of interface components corresponding to different navigation scenes being different, the first base map being connected to the first sky box;

combining the first base map and the first sky box to obtain a first virtual scene;

determining a skew angle of a virtual camera based on a skew angle adjustment range, a scale adjustment range, and a scaling operation;

determining a display proportion of a first sky box display region to a maximum sky box display region as a monotonic function of the skew angle over the skew angle adjustment range;

determining a sky box display region of the first sky box and a base map display region of the first base map based on the display proportion and the maximum sky box display region; and displaying a navigation interface based on a navigation picture obtained by photographing the first virtual scene via the virtual camera, the navigation picture comprising the sky box display region of the first sky box and the base map display region of the first base map.

2. The method according to claim 1, wherein the determining the first interface component based on the first navigation scene corresponding to the real-time environment information comprises:

determining a first scene view corresponding to the first navigation scene based on the real-time location information and the real-time time information;

determining the first base map corresponding to the first scene view based on correspondences between scene views and base map styles, the base map styles corresponding to navigation scenes of different scene views being different; and determining the first sky box corresponding to the first scene view based on correspondences between the scene views and sky box styles, the sky box styles corresponding to navigation scenes of different scene views being different.

3. The method according to claim 2, wherein the determining the first scene view corresponding to the first navigation scene based on the real-time location information and the real-time time information comprises:

determining a sunup time and a sundown time corresponding to a real-time location based on latitude and longitude in the real-time location information and a date in the real-time time information;

determining time periods corresponding to the scene views based on the sunup time, the sundown time, time differences between the time periods corresponding to the scene views and the sunup time, and time differences between the time periods corresponding to the scene views and the sundown time; and determining the first scene view based on correspondences between the scene views and the time periods and a first time period among the time periods corresponding to the scene views indicated by the real-time time information.

4. The method according to claim 2, wherein the determining the first base map corresponding to the first scene view based on correspondences between scene views and base map styles comprises:

determining a first scene weather corresponding to the first scene view based on the real-time location information and the real-time time information;

determining the first base map corresponding to the first scene view and the first scene weather based on correspondences of the scene views and scene weathers to the base map styles, the base map styles corresponding to different scene weathers under the same scene view being different; and the determining the first sky box corresponding to the first scene view based on correspondences between the scene views and sky box styles comprises:

determining the first sky box corresponding to the first scene view and the first scene weather based on correspondences of the scene views and the scene weathers to the sky box styles, the sky box styles corresponding to different scene weathers under the same scene view being different.

5. The method according to claim 1, wherein the first base map is connected to the first sky box, and a region in a first height above a contact surface between the first base map and the first sky box is a transition region; and the method further comprises:

combining the first base map and the first sky box to obtain the first virtual scene; and transparently mixing the transition region in the first virtual scene, the transparently-mixed transition region being displayed with a semi-transparent effect.

6. The method according to claim 5, wherein a virtual object having an intersection with a sky box display region in the navigation picture is displayed as a semi-transparent effect, the sky box display region is determined based on the skew angle adjustment range, the scale adjustment range, and the scaling operation, and the scaling operation is configured to adjust a scale and the skew angle of the virtual camera.

7. The method according to claim 5, wherein:

the skew angle of the virtual camera is determined based further on a first scale, the first scale being determined based on a default scale and the scaling operation; and the display proportion of the first sky box display region to the maximum sky box display region is determined based on a ratio of a first angle difference to a second angle difference, the first angle difference being an angle difference between the skew angle and a minimum angle in the skew angle adjustment range, and the second angle difference being an angle difference between a maximum angle and the minimum angle in the skew angle adjustment range; and the displaying the navigation interface further comprises:

processing a virtual object with a semi-transparent effect to obtain a semi-transparent navigation picture, the virtual object having an intersection with the sky box display region of the first sky box in the base map display region of the first base map; and displaying the navigation interface based on the semi-transparent navigation picture.

8. The method according to claim 3, wherein the displaying the navigation interface comprises:

obtaining a real-time solar altitude angle corresponding to the real-time time information and the real-time location information;

determining a first shadow effect of a virtual object on the first base map based on the real-time solar altitude angle, the real-time time information, and the real-time location information; and displaying, according to the first shadow effect, the navigation interface obtained by fusing the first base map and the first sky box.

9. The method according to claim 8, wherein the obtaining the real-time solar altitude angle corresponding to the real-time time information and the real-time location information comprises:

determining a direct solar radiation latitude based on the date in the real-time time information; and determining the real-time solar altitude angle based on a real-time latitude in the real-time location information and the direct solar radiation latitude.

10. The method according to claim 1, wherein the obtaining the real-time environment information comprises:

determining a navigation interface update policy based on a first network quality, the navigation interface update policy comprising an online policy and an offline policy; and obtaining the real-time environment information through the navigation interface update policy.

11. The method according to claim 10, wherein the determining the navigation interface update policy based on the first network quality comprises:

transmitting a network quality detection request to a background server in response to a navigation interface update instruction;

determining that the navigation interface update policy is the online policy in response to receiving a network quality detection response transmitted by the background server indicating that the first network quality satisfies a threshold condition; and determining that the navigation interface update policy is the offline policy in response to receiving the network quality detection response indicating that the first network quality does not satisfy the threshold condition, or not receiving the network quality detection response within a first duration.

12. The method according to claim 11, wherein the transmitting the network quality detection request to the background server comprises:

obtaining local environment information;

transmitting the network quality detection request and an information obtaining request to the background server, the information obtaining request comprising the local environment information, and the background server being configured to determine cloud environment information based on the local environment information and transmit the cloud environment information to the terminal in response to the first network quality satisfying the threshold condition; and the obtaining the real-time environment information through the navigation interface update policy comprises:

determining the real-time environment information based on the local environment information and the cloud environment information in the network quality detection response in response to the navigation interface update policy being the online policy; and determining the local environment information as the real-time environment information in response to the navigation interface update policy being the offline policy.

13. The method according to claim 12, wherein the local environment information comprises local time information, the local time information comprises a terminal system time and a global positioning system (GPS) time, and cloud time information in the cloud environment information is a server time; and the determining the real-time environment information based on the local environment information and the cloud environment information in the network quality detection response comprises:

determining the terminal system time as a real-time time in response to a time difference between any two of the terminal system time, the server time, and the GPS time being less than a time difference threshold;

determining the GPS time as the real-time time in response to the time difference between the terminal system time and the GPS time being greater than the time difference threshold; and determining the server time as the real-time time in response to not obtaining the GPS time and the time difference between the terminal system time and the server time being greater than the time difference threshold.

14. The method according to claim 12, wherein the local environment information comprises local time information, and the local time information comprises a terminal system time and a GPS time; and the determining the local environment information as the real-time environment information comprises:

determining the terminal system time as a real-time time in response to not obtaining the GPS time or a time difference between the GPS time and the terminal system time being less than a time difference threshold; and determining the GPS time as the real-time time in response to the time difference between the terminal system time and the GPS time being greater than the time difference threshold.

15. The method according to claim 12, wherein cloud location information in the cloud environment information is a server-determined positioning location; and the determining the real-time environment information based on the local environment information and the cloud environment information in the network quality detection response comprises:

determining the server-determined positioning location as a real-time location.

16. The method according to claim 12, wherein the local environment information comprises local location information, and the local location information comprises a GPS positioning location and a historical positioning location; and the determining the local environment information as the real-time environment information comprises:

determining the GPS positioning location as a real-time location in response to obtaining the GPS positioning location;

determining a last positioning location in the historical positioning location as the real-time location in response to not obtaining the GPS positioning location; and determining a default navigation location as the real-time location in response to not obtaining the GPS positioning location and in the absence of the historical positioning location.

17. A navigation interface display apparatus, the apparatus comprising:

at least one processor and at least one memory, the at least one memory storing at least one instruction, at least one program, a code set, or an instruction set, and the at least one instruction, the at least one program, the code set, or the instruction set being loaded and executed by the at least one processor to implement:

obtaining real-time environment information, the real-time environment information comprising real-time location information and real-time time information;

determining a first interface component based on a first navigation scene corresponding to the real-time environment information, the first interface component comprising a first base map and a first sky box, the first base map indicating a road surface environment, the first sky box indicating a sky environment, styles of interface components corresponding to different navigation scenes being different, the first base map being connected to the first sky box;

combining the first base map and the first sky box to obtain a first virtual scene;

determining a skew angle of a virtual camera based on a skew angle adjustment range, a scale adjustment range, and a scaling operation;

determining a display proportion of a first sky box display region to a maximum sky box display region as a monotonic function of the skew angle over the skew angle adjustment range;

determining a sky box display region of the first sky box and a base map display region of the first base map based on the display proportion and the maximum sky box display region; and displaying a navigation interface based on a navigation picture obtained by photographing the first virtual scene via the virtual camera, the navigation picture comprising the sky box display region of the first sky box and the base map display region of the first base map.

18. The apparatus according to claim 17, wherein the determining the first interface component based on the first navigation scene corresponding to the real-time environment information comprises:

determining a first scene view corresponding to the first navigation scene based on the real-time location information and the real-time time information;

determining the first base map corresponding to the first scene view based on correspondences between scene views and base map styles, the base map styles corresponding to navigation scenes of different scene views being different; and determining the first sky box corresponding to the first scene view based on correspondences between the scene views and sky box styles, the sky box styles corresponding to navigation scenes of different scene views being different.

19. The apparatus according to claim 18, wherein the determining the first scene view corresponding to the first navigation scene based on the real-time location information and the real-time time information comprises:

determining a sunup time and a sundown time corresponding to a real-time location based on latitude and longitude in the real-time location information and a date in the real-time time information;

determining time periods corresponding to the scene views based on the sunup time, the sundown time, time differences between the time periods corresponding to the scene views and the sunup time, and time differences between the time periods corresponding to the scene views and the sundown time; and determining the first scene view based on correspondences between the scene views and the time periods and a first time period among the time periods corresponding to the scene views indicated by the real-time time information.

20. A non-transitory computer-readable storage medium, the computer-readable storage medium storing at least one computer instruction, and the at least one computer instruction being loaded and executed by at least one processor to implement:

obtaining real-time environment information, the real-time environment information comprising real-time location information and real-time time information;

determining a first interface component based on a first navigation scene corresponding to the real-time environment information, the first interface component comprising a first base map and a first sky box, the first base map indicating a road surface environment, the first sky box indicating a sky environment, and styles of interface components corresponding to different navigation scenes being different, the first base map being connected to the first sky box;

combining the first base map and the first sky box to obtain a first virtual scene;

determining a skew angle of a virtual camera based on a skew angle adjustment range, a scale adjustment range, and a scaling operation;

determining a display proportion of a first sky box display region to a maximum sky box display region as a monotonic function of the skew angle over the skew angle adjustment range;

determining a sky box display region of the first sky box and a base map display region of the first base map based on the display proportion and the maximum sky box display region; and displaying a navigation interface based on a navigation picture obtained by photographing the first virtual scene via the virtual camera, the navigation picture comprising the sky box display region of the first sky box and the base map display region of the first base map.

* * * * *